March 2, 1926.

J. P. SEAHOLM 1,575,011

AGRICULTURAL TOOL

Filed Feb. 24, 1923     2 Sheets-Sheet 1

Inventor:
John P. Seaholm
by L.C. Shonts Atty.

March 2, 1926.

J. P. SEAHOLM 1,575,011

AGRICULTURAL TOOL

Filed Feb. 24, 1923  2 Sheets-Sheet 2

Inventor
John P. Seaholm
by L. C. Shonts
Atty.

Patented Mar. 2, 1926.

1,575,011

UNITED STATES PATENT OFFICE.

JOHN P. SEAHOLM, OF MOLINE, ILLINOIS, ASSIGNOR, BY MESNE ASSIGNMENTS, TO MOLINE IMPLEMENT COMPANY, A CORPORATION OF ILLINOIS.

AGRICULTURAL TOOL.

Application filed February 24, 1923. Serial No. 621,063.

*To all whom it may concern:*

Be it known that I, JOHN P. SEAHOLM, a citizen of the United States, residing at Moline, county of Rock Island, State of Illinois, have invented certain new and useful Improvements in Agricultural Tools, of which the following is a specification.

The invention relates to an agricultural tool.

In the co-pending application of Joseph E. Boda, Serial No. 590,314, filed September 25, 1922, there is shown a universal agricultural implement comprising a universal truck to which a wide variety of agricultural tools may be connected. The present invention relates particularly to connections of the agricultural tools as shown in said application.

One of the important features of this universal implement is the construction of the tool attachments and their connection to the carrying truck. In addition to the requirement that the tools themselves be simple, it is necessary that the associated parts and connections be simple, inexpensive, easy to connect, disconnect and adjust, and sufficiently rigid to withstand the various stresses and strains to which they may be subjected. For example, the supporting beams or arms must be sufficiently rigid to prevent bending, twisting, or breaking. The connection of the beams or arms to the carrying truck must be rigid and strong because the stress on the connection will be great in many cases. The problem that presents itself is to make the arms or beams and the connections of the proper strength without making them large, clumsy, expensive and difficult to handle.

The general object of the invention is to provide improved agricultural tools and connections therefor.

A more specific object is to provide a strong, durable, efficient, simple and inexpensive connection for connecting implement beams to a carrying truck of the type described in the co-pending application to which reference is made.

Other objects and advantages of the invention will appear from the specification and drawings.

An embodiment of the invention is illustrated in the drawings in which.

Figure 1:
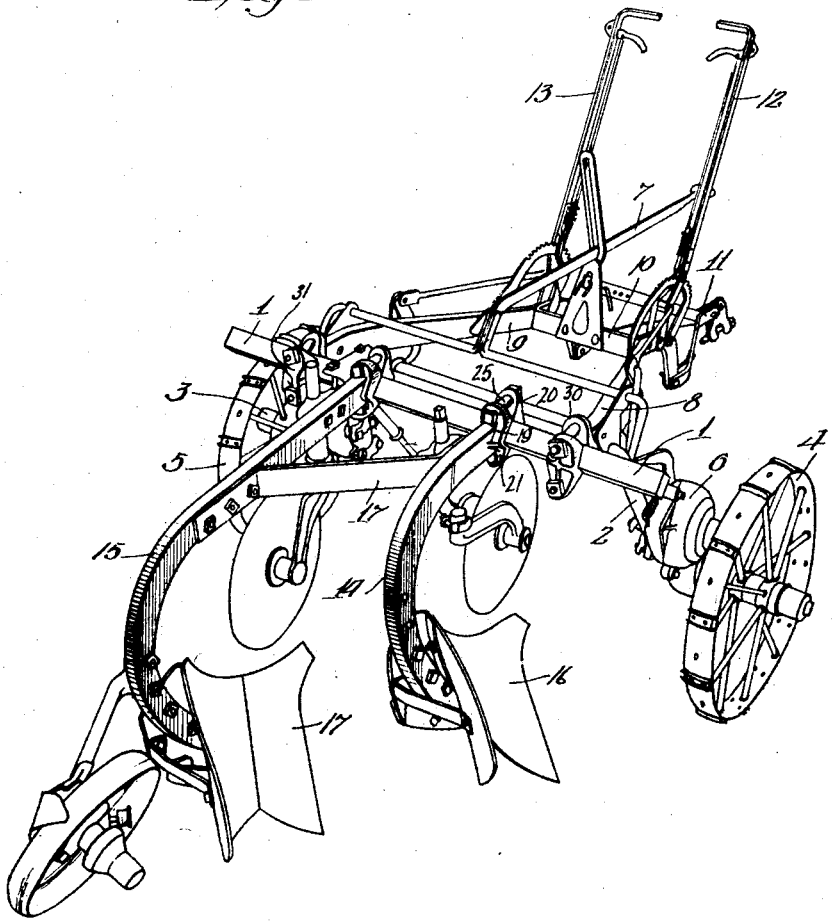
Figure 1 is a perspective of the universal truck with implement beams connected to it.
Figure 2:
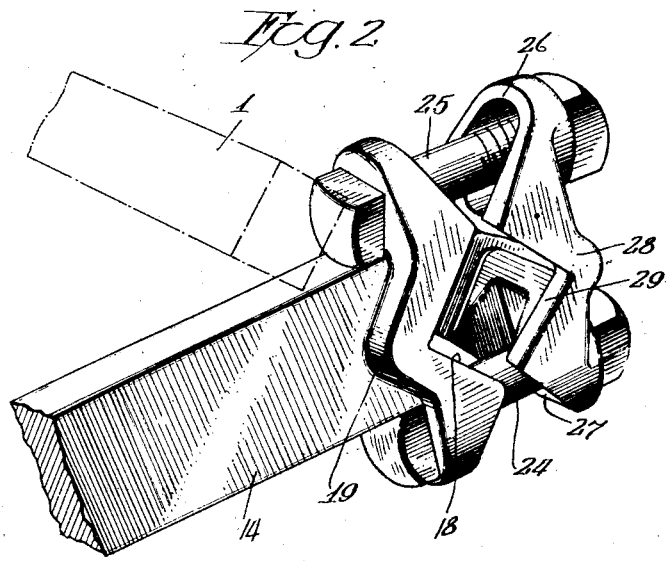
Figure 2 is an enlarged perspective of the end of one of the beams showing how it is connected to the carrying truck.
Figure 3:
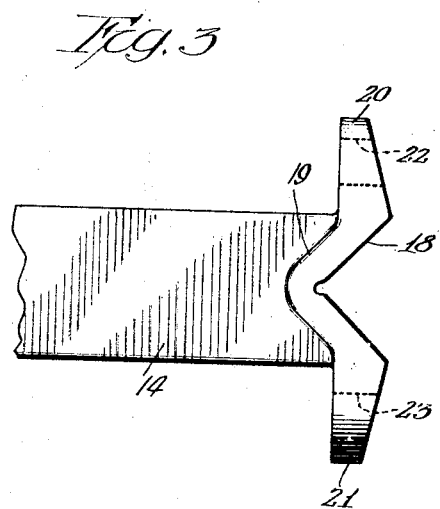
Figure 3 is a side elevation of the end of one of the beams.

The carrying truck is described in detail in the co-pending application referred to. It comprises, in general, a tool bar 1 supported by crank axles 2 and 3 carrying ground wheels 4 and 5. The crank axles are swung back and forth for raising and lowering the machine by means of a powerlift mechanism 6 operated by travel of the ground wheel 4, and a similar powerlift mechanism, not shown, operated by travel of the ground wheel 5. These two mechanisms are simultaneously controlled by a lever 7. Draft bars 8 and 9 are connected to the tool bar 1, such members being connected together by a cross brace 10 to which a hitch 11 is connected. The right hand crank axle 2 may be adjusted for height by means of a lever 12, and the left hand crank axle 3 may be adjusted for height by means of the lever 13.

The tool bar 1 is a heavy rectangular metal bar, preferably square. Its length may be varied to suit the requirements. It is positioned with two of its edges in a substantial vertical plane.

A wide variety of agricultural tools can be connected to this tool bar. It is necessary that the connection be a rigid one, that it be easily adjustable, and that it permit the tool attachments to be easily connected and disconnected.

The tool attachment illustrated is a plow comprising beams 14 and 15 carrying plow bodies 16 and 17. The beam 14 is shorter than the beam 15 so that the plows will be in proper staggered relation. The beams are connected together by a cross brace 17. Two plow beams are shown, but it is to be understood that one or more may be used.

Instead of riveting, bolting, or otherwise fastening a bracket onto the beams, the end of each beam is forged to fit the tool bar. A V-shaped notch 18 is formed in the end of the beam so that the beam has two sides of sufficient length to embrace two of the sides of the tool bar. In forging this notch, the metal is forced out at the sides of the bars to provide strenghtening ribs 19 and to provide a wider bearing surface. Upper and lower ears 20 and 21 are formed having openings 22 and 23 respectively. The width of the forged end is such that when the beam is clamped to the tool bar 1, it cannot be turned sidewise on the tool bar in a horizontal plane.

The beam is clamped to the tool bar by means of bolts 24 and 25 which pass through the openings 22 and 23 in the forged end of the beam, and through similar openings 26 and 27 in the clamping bracket 28 which comprises a forging having a V-shaped notch 29 with sides adapted to fit over two of the sides of the tool bar.

When the beam is clamped in place with one bolt above and the other below the bar 1, it is prevented from turning about the bar in a vertical plane by reason of its contact with two edges of the bar and because it is tightly clamped in place by bolts of sufficient size to withstand the strain. The manner in which the end of the beam is shaped puts some of the strain directly on the tool bar. The width of the bearing surface of the forged end of the beam prevents the attachment from turning sidewise.

The beam may be easily connected to the tool bar by placing its end in contact with the tool bar, putting the complementary clamping member in position and inserting the bolts for holding the two members together. It is easy to adjust the beam along the tool bar to vary the position of the tool by loosening the bolts and sliding the attachment along the bar.

The fact that the end of the beam is forged does away with all weakness due to welding or due to the connecting of separate brackets to the beams by means of bolts, rivets, etc. The connection is extremely simple and it avoids the necessity for numerous parts, there being only the clamping member and the bolts to be used with the beam for connecting the attachment in place.

This same type of connection is used for connecting the draft bars of the carrying truck to the tool bar, such connections being illustrated at 30 and 31 in Figure 1.

Various types of tool attachments having arms with forged ends for connection to the tool bar may be substituted for the plows shown.

It will be understood that the type of carrying truck with which these attachments are used can be varied to suit the requirements.

The structure shown is for purposes of illustration only and variations may be made in it without departing from the spirit and scope of the invention as defined in the appending claim.

I claim:

In a connection for heavy agricultural tools, a square tool bar adapted to be supported by a wheeled carrier, said bar being positioned with two of its edges in a substantially vertical plane, a relatively narrow rectangular plow beam for carrying a plow body, said beam being positioned with its greatest width in a vertical plane and having one end forged to provide a bearing of greater width than the beam, said bearing having a horizontally extending, V-shaped notch in its face so that the bearing will fit onto two sides of the tool bar, ears formed on the bearing, one projecting upwardly and the other downwardly, a complementary clamping member having a V-shaped notch for fitting on the sides of the bar opposite to the bearing, said clamping member having one ear projecting upwardly and another projecting downwardly, the V-shaped notches in the bearing and the clamping member being of such depth that the bearing and clamping member are separated a substantial distance from one another, a bolt for connecting the ears of the bearing and of the clamping member above the tool bar, and a second bolt for connecting the ears of the bearing and the clamping member below the tool bar, whereby the beam is tightly clamped against the bar.

In testimony whereof, I affix my signature.

JOHN P. SEAHOLM.